Jan. 25, 1955  A. W. RAFFERTY  2,700,488
ANTIAERATION CONTROL MECHANISM
IN FLUID DISPENSING APPARATUS
Filed Sept. 10, 1949

INVENTOR.
ARTHUR W. RAFFERTY
BY
ATTORNEY

United States Patent Office 2,700,488
Patented Jan. 25, 1955

2,700,488

ANTIAERATION CONTROL MECHANISM IN FLUID DISPENSING APPARATUS

Arthur W. Rafferty, Sacramento, Calif.

Application September 10, 1949, Serial No. 114,993

5 Claims. (Cl. 222—71)

This invention relates to anti-aeration control mechanism in fluid dispensing apparatus. The invention relates more particularly to a device in a fluid dispensing system for eliminating voids in the fluid which renders an inaccurate measuring of discharge of fluid from the dispensing system. Such voids may be caused by expansion or contraction, or evaporation, of measured fluid, or by resilient rebound of a hose pressure, or from like causes.

The invention assumes the existence in the dispensing apparatus of a pressure source for fluid, such as a pump, a fluid conduit therefrom to a metering device and a relief-check valve between the pump and meter, and a suitable dispensing or discharge outlet, all of which are conventional in a standard known dispensing apparatus or pump of the type employed in so-called filling stations for petroleum products.

Briefly, this invention contemplates installing a mechanism in the fluid system comprising a reserve tank or container having a pressure chamber in communication with the supply conduit of the fluid dispensing system between the relief-check valve and the meter, wherein an auxiliary supply of the fluid is maintained in the pressure chamber of the reserve tank under sufficient pressure to force a portion of the reserve liquid into the fluid conveyor line and thereby fill any volumetric spaces which otherwise would be voids in the metered portion of the fluid.

An example of advantageous use of the invention may be cited in the present dispensing pump equipment used in gasoline filling stations. In the retail sale of gasoline in service stations, the product is usually handled by electrically operated pumps which draw the product from underground storage tanks. The liquid passes through a strainer, a pump, an air eliminator, a check valve with a relief return therein, and thence to a meter which usually has a register, and finally through a flexible hose having at its free end a dispensing nozzle by which the operator controls the flow into the tank being refueled. In many pumps it is usual for fluid to pass through glass gauges located at the point of attachment of the hose. These gauges, usually termed "visi-gauges" permit observation of the flow of liquid to the tank.

Such liquids are of relatively high price, and in order to meet the requirements of the laws regulating such sales to the public, it is necessary to maintain great accuracy in dispensing equipment for this purpose. Any failure in accuracy of deliveries results in condemnation of equipment until satisfactory repair or adjustment has been made, often an expensive process.

To assure that all portions of the system normally containing metered fluid beyond the meter shall remain fully primed at all times, it is usual to install a check valve in the system between the pump, or delivery outlet of the air eliminator if used, and the inlet of the meter. Thus, the fluid already in the delivery portion of the system is prevented by the check valve from leaking back by gravity when the pump is inoperative. This system of maintaining the fluid volume and pressure in the conduit line works very well against the force of gravity, but is not efficient against back pressure forces in excess of gravity.

It is to be noted that the petroleum products such as the various grades of automotive gasolines are to a great degree sensitive to temperature; they change in volume approximately .0005 to .0007 gallon per degree per thousand gallons. In normal sales of gasoline in wholesale quantities it is usual to compute the quantity on a basis of 60 degrees of temperature.

As temperature rises during the day, fluid in the dispensing system between check valve and the discharge valve or nozzle expands, and if some means of pressure release were not provided the hose or visi-glass would burst from pressure produced by expansion of the fluid. To avoid this situation, it is usual for the check valve (previously referred to) to contain a small return relief valve set at an opening pressure higher than the normal pump pressure, that is, the pump pressure plus the pressure induced by expansion of the fluid. This return relief valve opens and permits a reverse flow, usually to the air chamber of the air eliminator when rising expansion pressure makes such release necessary.

As the cooler part of the day arrives, a lower temperature causes a natural and unavoidable contracting or shrinking in the volume of previously metered fluid above or beyond the meter. This contraction or shrinkage permits a vacuum condition or voids to occur in the conduit or receptacle beyond the meter, resulting in air being sucked through the check valve, toward the discharge outlet, or in the taking of included air or gases held dispersely in the liquid product itself whereby pockets of air or gas are formed in the fluid beyond the check valve and the meter. This is often noticeable by the presence of such pockets in the visi-glass device. The volume of such air or gases varies with the degree of temperature change and the volume of fluid normally in the system above the meter. When the pump is started under this condition, the pressure rises to normal pump pressure of about 15 pounds per square inch, and any such gaseous pocket inclusions are compressed and the fluid passing from the pump through the meter to effect this compression is registered as part of the sale, even though the dispensing nozzle has not been opened. This false registration will vary with conditions, the error of fluid volume representing an average of value from 1¢ to 5¢ as indicated on the money register operated by the meter. Many authorities having supervision of sales to the public strenuously object to and condemn apparatus for this false registration.

The present invention is for the purpose of avoiding the aforesaid false registration by removing the cause.

One form in which the invention may be embodied is described herein and illustrated in the accompanying drawing, in which.

Figure 1:
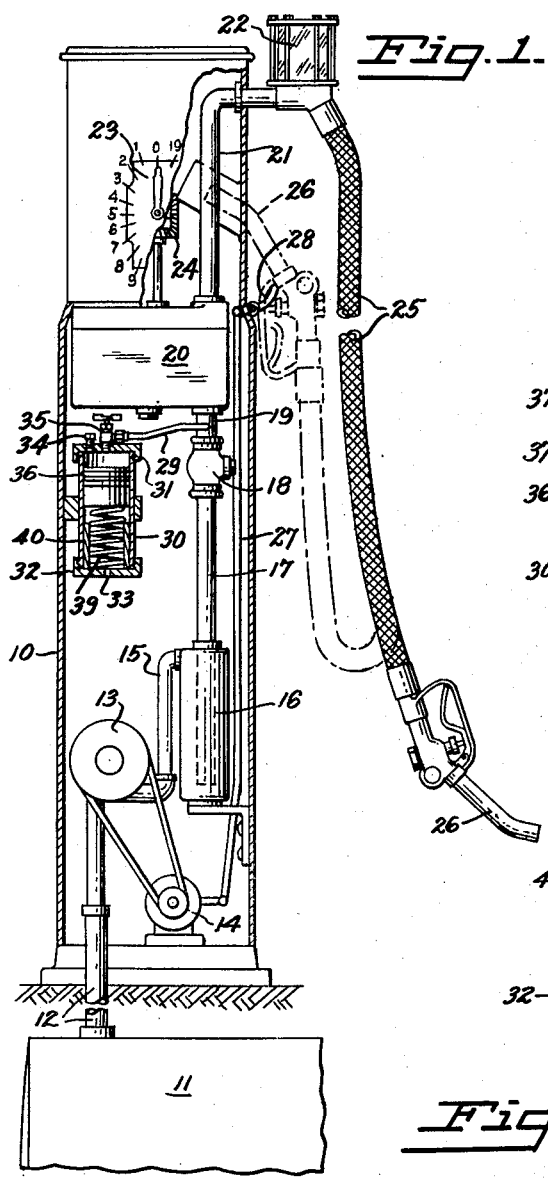
Fig. 1 is a vertical front elevation of a dispensing apparatus, with portions in section, showing environment of the invention relative to conventional elements of a dispensing apparatus of the gasoline filling station type.

Referring to the drawing in which like reference characters indicate corresponding parts in the several views, and first referring particularly to the comprehensive view of Fig. 1 illustrating generally a conventional dispensing assembly for liquid petroleum products, a conventional casing is indicated 10 and the usual underground storage tank is indicated 11. A supply conduit 12 extends from the underground tank to a pump 13 operated by motor 14, to raise the liquid products from the tank to the dispensing apparatus. From pump 13 the liquid is pumped through conduit 15 to any suitable air eliminator 16 wherein it is deprived of occluded air bubbles picked up in the pumping operation. From the air eliminator the liquid is pumped through a conduit 17 and through a combination check and relief valve 18 and thence through conduit 19 to a suitable liquid meter 20 where its volume is measured. The meter 20 may be of any suitable type, many of which are standard in commerce, and is therefore not described in detail. From the meter 20 the liquid flows responsive to pump pressure through conduit 21 to the transparent sight cylinder or visi-glass 22, the volume or monetary amount or both being registered on the indicator 23 operated by the meter through any suitable shaft and gearing 24. From the visi-galss the liquid is dispensed through hose 25 and nozzle 26, which may include a manually operable discharge valve as usual. A lever 27 conveniently adjacent the hose and the nozzle rack 28 is usually included in the dispensing assembly for starting and stopping the operation of the pump 13 and motor 14.

Figure 2:
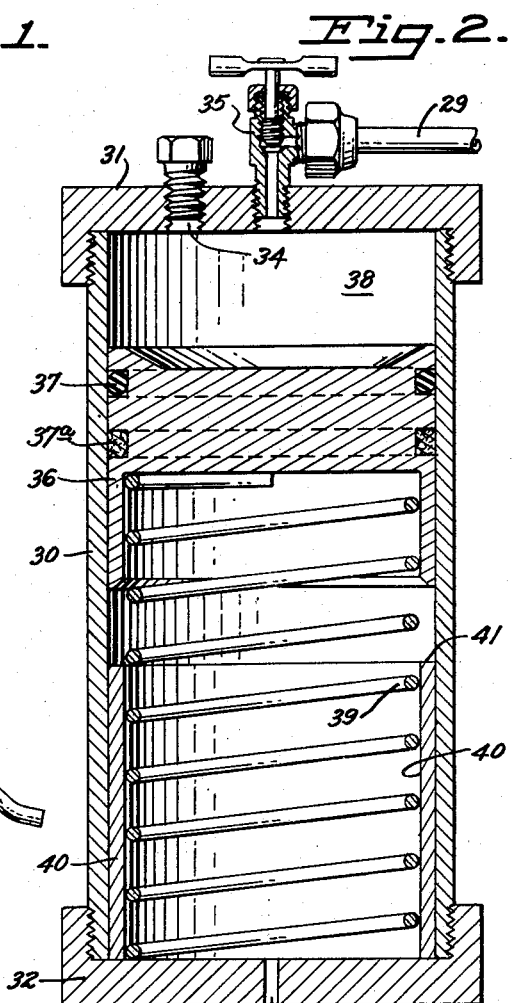
Fig. 2 is an enlarged vertical central section of reserve tank of Fig. 1.
Figure 3:
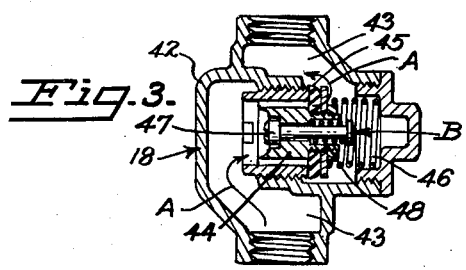
Fig. 3 is an enlarged vertical central section of relief check valve of Fig. 1.
Figure 4:
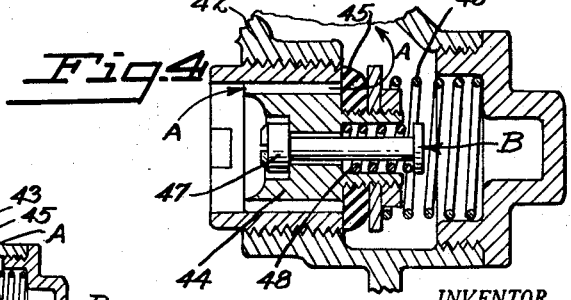
Fig. 4 is an enlarged view of portion of Fig. 3.

A preferred form of apparatus for pressure on an auxiliary reserve fluid is shown in Fig. 2, which comprises the novel feature of the invention. Communicating through tube 29 with the portion 19 of the supply conduit at a point intermediate the relief check valve 18 and the meter 20, is a reserve tank pressure apparatus comprising a cylinder 30 mounted on a vertical axis having top closure 31 and bottom closure 32 with preferably conveniently threaded connection to the cylinder. The bottom closure has a breathing opening 33, and the top closure has an air vent 34 and a pet cock 35 to the latter of which the tube 29 may be connected. Within the cylinder is a snugly slidable piston 36 preferably packed by resilient O-ring 37 and having a lubricating ring 37a, and providing in the cylinder, between piston and top closure, a pressure chamber 38 for reserve liquid, the pressure chamber being thus in continuously open communication through tube 29, with the supply conduit at a point between the check valve and the meter.

The piston is spring loaded upwardly toward the pressure chamber by a coil spring 39 footed on the bottom closure 33, the tension value of the spring being less per square inch than pump pressure, so as to maintain a mild pressure on the reserve liquid. Within the lower portion of the reserve tank below the piston is a means to stop the downward movement of the piston, comprising an annular tube or sleeve member 40 providing a shoulder 41 against which the piston may abut to delimit its downward movement, and define the capacity of pressure chamber 38. While the piston exemplified herein is a preferred means of maintaining a pressure on liquid in the pressure chamber, other compressible means may be so employed, such as an inflatable and deflatable bladder, or a stretchable resilient sheet diaphragm.

The relief check valve 18 in the liquid supply conduit is preferably closely spaced from the intake side of the meter so as to avoid a relatively large quantity of liquid in the supply conduit between the inlet port of the meter and the relief check valve. The relief check valve may be of any suitable or conventional two-way type having housing 42 and passageway 43 therethrough. Interrupting the passageway within the housing is threadedly mounted a poppet check valve the slidable poppet member 44 having orifices sufficiently large to permit relatively free flow therethrough in one direction downstream or toward the meter, as indicated by the arrows A. The valve check plate 45 is carried by the poppet member 44, and the poppet assembly is spring loaded against its seat member by spring 46 to close the valve against reverse flow. The spring 46 has a tension value less than the normal pumping pressure so that the flow through the valve toward the meter is substantially unrestricted. However, when the pump is idle and the liquid expands or volatilizes there is a substantially high or considerable upstream or back pressure of liquid against the check valve and particularly within and forward of or upstream from the meter, which, unless relieved of excessive pressure, would be likely to injure the meter or tubing or other inclusive apparatus from meter to the check valve. To relieve such pressure, the check valve is provided with a by-pass relief valve 47 adapted to open responsive to back pressure opposite to the direction of pump pressure flow through the check valve seat and plate 44, 45, such opposite or reverse flow being indicated by arrow B. This relief valve 47 is also loaded to a closed position by tension of a spring 48, the tension value of the spring being less than the force of the back pressure. Therefore, the relief valve 47 remains closed when the fluid is flowing through the check valve 18 towards the meter, but opens responsive to the back pressure for release thereof.

With the reserve tank device attached to a dispensing unit, every time the pump is started, preliminary to a discharge or sale of the fluid, the unmeasured fluid from the pump enters the pressure chamber 38 if at the time it is less than full, to provide a reserve supply of fluid therein to the limits of the stop member 40. When the pump is inoperative, a mild fluid pressure is maintained at all times in the fluid system above the check valve 18 by the upwardly spring loaded piston in the reserve chamber. This mild pressure is less than the normal pump pressure during delivery period. If, while the pump is inoperative, evaporation or atmospheric temperature changes cause shrinkage of volume of the fluid at any point between the check valve and nozzle, and more particularly in or beyond the meter, the void is automatically filled by return flow of reserve fluid from the pressure chamber 38 to the supply conduit 19 between check valve 18 and meter 20 responsive to the upward spring loading of the piston 36. Thus air inclusions are avoided by the constant maintenance of the mild pressure on the liquid above the check valve, even though the pump be dormant.

The contents of the reserve chamber is sufficient to replace any loss in volume arising from normal shrinkage plus a reasonable reserve to care for any minor leakage of the check valve. At any time the pump is started, the reserve chamber will be automatically recharged as required by unmeasured fluid from the pump taken from the supply conduit 19 below the meter in order to avoid disturbing the accuracy of the measured liquid. Thus, when the discharge or delivery nozzle is opened the purchaser is obtaining full volume of liquid, as shown by the register, since all voids in the liquids beyond the check valve have been eliminated by the constant mild pressure of the reserve tank.

The contraction of volume of the liquid between the meter and dispensing outlet 26 and the air pocket voids created thereby is particularly acute in situations where dispensing hose lines are of very substantial length and subject to considerable liquid pressure, as in fueling airplanes at an airport runway, since the mounting of the meter and check valves are normally located a considerable distance from the runway and the dispensing hose is proportionately longer. However, such a situation would merely accentuate the problem met in the gasoline filling station with its dispensing or discharge hose and the discharge valve. The length and pressure of the hose for refueling airplanes and the like under such circumstances would magnify the problem only in a matter of degree and would not require substantial changing of the apparatus nor the mode of operation thereof.

It is to be observed that when the expansion of the liquid forces previously measured liquid back through the meter and relief valve in the supply conduit, or when air is sucked from the air eliminator through the meter, or when liquid is supplied from the reserve tank to the meter and beyond to fill voids, theoretically, the meter should automatically make deductions or additions in amount or volume corresponding to the flow therethrough, but, practically, displacement meters for liquids must be constructed to operate without the tight frictional fit of pistons, and since these exchanged volumes of air or liquid passing through the meter are relatively small compared to a pumped volume, and the flow thereof is spread over a substantial period of time, they pass through the meter as slippage or seepage not sufficient in quantity or force of flow to affect the operation of the meter. Therefore, supplementing liquid from the reserve tank to replace the voids of previously metered liquid does not increase the reading on the register of the meter, and the purchasing consumer is charged only for the actual metered fluid delivered.

While, for purposes of example, the description herein refers principally to inclusions or pockets of air, it is to be understood to also include similar inclusions or pockets of any type of gaseous vapor, such as may be characteristic of and incidental to volatile liquids.

Having described the invention, what is claimed as new and patentable, is:

1. In a liquid dispensing apparatus having a dispensing conduit and a liquid meter communicating in said conduit, a pressure source and a conduit to supply liquid therefrom to the meter, and a check valve means in said supply conduit between the pressure source and the meter inlet adapted to provide relatively free flow toward the meter and a more restricted flow in the opposite direction, the combination therewith of a reserve tank for receiving an auxiliary supply of liquid, comprising a cylindrical tank member mounted on a vertical axis, a piston compression member in the tank member providing a pressure chamber at one side thereof for receiving and discharging the auxiliary supply of liquid and having continuously open communication with the supply conduit between the check valve and the meter inlet, the tank member being open to atmospheric pressure at the opposite side of the compression piston member, and resilient means of less tension value than the pressure source for moving the piston member towards the pressure chamber and thereby expelling the auxiliary liquid from the pressure chamber into the supply conduit between the check valve and the meter.

2. A dispensing apparatus for liquids having the elements of claim 1 and in which there is provided a stop means to delimit the movement of the piston compression member in the reserve tank member.

3. An apparatus of the character described, having the elements of claim 1 and in which the reserve tank includes resilient means normally urging the piston compression member towards the pressure chamber.

4. A dispensing apparatus for expandable and volatile liquids including a dispensing conduit and a liquid meter communicating in said conduit, a pressure source and a conduit to supply liquid therefrom to the meter, a two-way relief by-pass check valve means in said supply conduit between the pressure source and meter, said valve having greater freedom of flow towards the meter than in the opposite direction, a reserve cylindrical tank provided with a pressure chamber mounted on a vertical axis for receiving an auxiliary supply of liquid, the pressure chamber continuously communicating freely with the supply conduit between the check valve and the meter, a piston compression member in the reserve tank, and resilient coil spring means for moving the compression piston member toward the pressure chamber and thereby expel the auxiliary liquid from the pressure chamber into the supply conduit between the check valve and the meter, said tank being open to atmospheric pressure at the side of the compression means opposite the pressure chamber.

5. In a liquid dispensing apparatus having a liquid meter and an outlet for dispensing metered liquid, a pump and a conduit to supply fluid to the meter and a two-way check valve means in the supply conduit between the pump and the meter, said valve having greater freedom of flow towards the meter than in the opposite direction, the combination therewith of a reserve tank for an auxiliary supply of fluid, comprising a cylinder tank member and a piston reciprocable therein, said tank being provided with a pressure chamber at one side of the piston for receiving the auxiliary supply of fluid, said pressure chamber continuously communicating with the supply conduit between the check valve and the inlet of the meter, spring means at the opposite side of the piston for urging the piston towards the pressure chamber and thereby expelling the auxiliary fluid from the pressure chamber into the supply conduit, said tank being open to atmospheric pressure at the opposite side of the piston, said spring having a less pressure tension value on the piston than the pressure of the pump on the liquid in the supply conduit.

References Cited in the file of this patent

UNITED STATES PATENTS

| | | |
|---|---|---|
| 611,823 | Steier | Oct. 4, 1898 |
| 1,956,759 | Essex | May 1, 1934 |
| 1,978,597 | Peter | Oct. 30, 1934 |
| 2,013,431 | Bechtold | Sept. 3, 1935 |
| 2,021,850 | Carlson | Nov. 19, 1935 |
| 2,043,035 | De Lancy | June 2, 1936 |
| 2,113,676 | Carroll | Apr. 12, 1938 |
| 2,289,003 | Foss | July 7, 1942 |